US012491223B2

(12) United States Patent
Cheng et al.

(10) Patent No.: US 12,491,223 B2
(45) Date of Patent: Dec. 9, 2025

(54) METHOD FOR TREATING AN AUDITORY NEUROPATHY SPECTRUM DISORDER

(71) Applicants: AKOUOS, INC., Indianapolis, IN (US); Taipei Veterans General Hospital, Taipei (TW); National Taiwan University Hospital, Taipei (TW)

(72) Inventors: Yen-Fu Cheng, Taipei (TW); Chen-Chi Wu, Taipei (TW); Ying-Chang Lu, Taipei (TW); Robert Ng, Newton, MA (US); Danielle R. Lenz, Brookline, MA (US)

(73) Assignees: Akouos, Inc., Indianapolis, IN (US); Taipei Veterans General Hospital, Taipei (TW); National Taiwan University Hospital, Taipei (TW)

( * ) Notice: Subject to any disclaimer, the term of this patent is extended or adjusted under 35 U.S.C. 154(b) by 835 days.

(21) Appl. No.: 17/280,786

(22) PCT Filed: Sep. 27, 2019

(86) PCT No.: PCT/US2019/053465
§ 371 (c)(1),
(2) Date: Mar. 26, 2021

(87) PCT Pub. No.: WO2020/069320
PCT Pub. Date: Apr. 2, 2020

(65) Prior Publication Data
US 2022/0000972 A1 Jan. 6, 2022

Related U.S. Application Data

(60) Provisional application No. 62/737,406, filed on Sep. 27, 2018.

(51) Int. Cl.
*A61K 35/761* (2015.01)
*A61K 35/76* (2015.01)
*A61K 38/17* (2006.01)
*A61K 48/00* (2006.01)
*A61P 27/16* (2006.01)
*C07K 14/47* (2006.01)
*C12N 15/85* (2006.01)

(52) U.S. Cl.
CPC ............ *A61K 35/761* (2013.01); *A61K 35/76* (2013.01); *A61K 38/1703* (2013.01); *A61K 48/0058* (2013.01); *A61K 48/0075* (2013.01); *A61K 48/0083* (2013.01); *A61P 27/16* (2018.01); *C07K 14/47* (2013.01); *C12N 15/8509* (2013.01); *A61K 48/00* (2013.01)

(58) Field of Classification Search
CPC ........ A61K 35/761; A61K 35/76; A61P 27/16
See application file for complete search history.

(56) References Cited

U.S. PATENT DOCUMENTS

2018/0055908 A1 3/2018 Petit et al.

FOREIGN PATENT DOCUMENTS

| CN | 102747146 A | 10/2012 | |
|---|---|---|---|
| CN | 102864216 A | 1/2013 | |
| WO | WO-2016131981 A1 * | 8/2016 | ........... A61K 35/761 |
| WO | WO-2017100791 A1 * | 6/2017 | ............. A61K 39/00 |
| WO | WO 2018/145111 A9 | 8/2018 | |
| WO | WO-2018145111 A1 * | 8/2018 | ........... A61K 48/005 |

OTHER PUBLICATIONS

GenBank (Mus musculus pejvakin; NM_001080711.2). https://www.ncbi.nlm.nih.gov/nuccore/NM_001080711.2 (Year: 2006).*
GenBank. *Homo sapiens* pejvakin; NM_001042702; identified in 1993. https://www.ncbi.nlm.nih.gov/nuccore/NM_001042702 (Year: 2024).*
Wu et al. Identifying Children With Poor Cochlear Implantation Outcomes Using Massively Parallel Sequencing. Medicine, 2015, 94 (27):e1073, cited in IDS (Year: 2015).*
International Search Report (ISA/210) issued in PCT/US2019/053465 dated Mar. 2, 2020.
International Written Opinion ISA/237 issued in PCT/US2019/053465 dated Mar. 2, 2020.
Wu et al. "Identifying Children With Poor Cochlear Implantation Outcomes Using Massively Parallel Sequencing" Medicine, Jul. 2015, vol. 94, No. 27, p. e1073; p. 7, col. 2, para 1.
Perez, H. et al., Audiologic evaluation in Charcot-Marie-Tooth disease, Scand. Audiol. Suppl., 30:211-213 (1988).
Bae, S.H. et al., Genetic analysis of auditory neuropathy spectrum disorder in the Korean population, Gene, 522(1):65-69 (2013).
Beutner, D. et al., Risk factors for auditory neuropathy/auditory synaptopathy, Orl J. Otorhinolaryngol. Relat. Spec., 69(4):239-244 (2007).
Collin, R.W.J. et al., Involvement of DFNB59 mutations in autosomal recessive nonsyndromic hearing impairment, Hum. Mutat., 28(7):718-723 (2007).
De Siati, R.D. et al., Auditory Neuropathy Spectrum Disorders: From Diagnosis to Treatment: Literature Review and Case Reports, J. Clin. Med., 9(4):1074 (2020).
Delmaghani, S. et al., Hypervulnerability to Sound Exposure through Impaired Adaptive Proliferation of Peroxisomes, Cell, 163(4):894-906 (2015).
Delmaghani, S. et al., Mutations in the gene encoding pejvakin, a newly identified protein of the afferent auditory pathway, cause DFNB59 auditory neuropathy, Nat. Genet., 770-778 (2006).

(Continued)

*Primary Examiner* — Arthur S Leonard
*Assistant Examiner* — Keenan A Bates
(74) *Attorney, Agent, or Firm* — Choate, Hall & Stewart LLP; Stephanie L. Schonewald; Mandeep Kaur

(57) ABSTRACT

The present invention provides a method for treating an auditory neuropathy spectrum disorder in a subject comprising transferring the gene of DFNB59 via an adeno-associated virus (AAV) vector to the subject.

10 Claims, 9 Drawing Sheets
Specification includes a Sequence Listing.

(56) References Cited

OTHER PUBLICATIONS

Guo, J. et al., GJB2 gene therapy and conditional deletion reveal developmental stage-dependent effects on inner ear structure and function, Mol. Ther. Methods Clin. Dev., 23;319-333 (2021).

Landegger, L. D. et al., A synthetic AAV vector enables safe and efficient gene transfer to the mammalian inner ear, Nat. Biotechnol., 35 280-284 (2017).

Lu, Y.C. et al., Establishment of a knock-in mouse model with the SLC26A4 c.919-2A>G mutation and characterization of its pathology, PLoS One, 6(7):e22150 (2011).

Madden, C. et al., Clinical and audiological features in auditory neuropathy, Arch. Otorlaryngol. Head Neck Surg., 128(9):1026-1030 (2002).

Manchaiah, V.K.C. et al., The genetic basis of auditory neuropathy spectrum disorder (ANSD), Int. J. Pediatr. Otorhinolaryngol., 75(2):151-158 (2011).

Minoda, R. et al., Potential treatments for genetic hearing loss in humans: current conundrums, Gene. Ther., 22(8):603-609 (2015).

Nadol, J.B., Hearing loss, N. Engl. J. Med., 329(15):1092-1102 (1993).

Rance, G. et al., Clinical findings for a group of infants and young children with auditory neuropathy, Ear Hear., 20(3):238-252 (1999).

Rance, G., Auditory neuropathy/dys-synchrony and its perceptual consequences, Trends Amplif., 9(1):1-43 (2005).

Rodriguez-Ballesteros, M. et al., A multicenter study on the prevalence and spectrum of mutations in the otoferlin gene (OTOF) in subjects with nonsyndromic hearing impairment and auditory neuropathy, Hum. Matat., 29(6):823-831 (2008).

Starr, A. et al., Auditory neuropathy, Brain, 119(Pt 3):741-753 (1996).

Starr, A. et al., The varieties of auditory neuropathy, J. Basic Clin. Physiol. Pharmacol., 11(3):215-230 (2000).

Suzuki, J. et al., Cochlear gene therapy with ancestral AAV in adult mice: complete transduction of inner hair cells without cochlear dysfunction, *Sci Rep.*, 7:45524, pp. 1-11 (2017).

Swanepoel, D., Auditory pathology in cri-du-chat (5p-) syndrome: phenotypic evidence for auditory neuropathy, Clin. Genet., 72(4):369-373 (2007).

Wang, J. et al., Variants of OTOF and PJVK genes in Chinese patients with auditory neuropathy spectrum disorder, PLoS One, 6(9):e24000 (2011).

Zhang, W. et al., Cochlear Gene Therapy for Sensorineural Hearing Loss: Current Status and Major Remaining Hurdles for Translational Success, Front. Mol. Neurosci., 11:221 (2018).

Zinn, E. et al., In Silico Reconstruction of the Viral Evolutionary Lineage Yields a Potent Gene Therapy Vector, Cell. Rep., 12(6):1056-1068 (2015).

\* cited by examiner (Upper Basel)

(Lower Basel)

| | Normal control (n=6) | Pjvk untreated control (n=8) | Pjvk treated w/Anc80-Pjvk (n=8) | Pjvk treated w/Anc80-GFP (n=5) |
|---|---|---|---|---|
| Time on rod (sec) | 213.2 ± 7.2 | 65.1 ± 13.1 | 213.4 ± 12.3 | 79.4 ± 7.7 |
| Swim test score | 0 | 3 | 0 | 3 |

SEQUENCE LISTING

```
<160> NUMBER OF SEQ ID NOS: 10

<210> SEQ ID NO 1
<211> LENGTH: 14
<212> TYPE: PRT
<213> ORGANISM: Artificial Sequence
<220> FEATURE:
<223> OTHER INFORMATION: Synthetic

<400> SEQUENCE: 1

Leu Lys Glu Arg Thr His Ile Arg Val Asn Leu Leu Asn His
1               5                   10

<210> SEQ ID NO 2
<211> LENGTH: 44
<212> TYPE: DNA
<213> ORGANISM: Artificial Sequence
<220> FEATURE:
<223> OTHER INFORMATION: Synthetic

<400> SEQUENCE: 2
cctcaaggag aggactcaca tacgcgttaa cttactaaac caca            44

<210> SEQ ID NO 3
<211> LENGTH: 20
<212> TYPE: DNA
<213> ORGANISM: Artificial Sequence
<220> FEATURE:
<223> OTHER INFORMATION: Synthetic

<400> SEQUENCE: 3
cctgcaccac caactgctta                                       20

<210> SEQ ID NO 4
<211> LENGTH: 21
<212> TYPE: DNA
<213> ORGANISM: Artificial Sequence
<220> FEATURE:
<223> OTHER INFORMATION: Synthetic

<400> SEQUENCE: 4
ggccatccac agtcttctga g                                     21

<210> SEQ ID NO 5
<211> LENGTH: 20
<212> TYPE: DNA
<213> ORGANISM: Artificial Sequence
<220> FEATURE:
```

```
<223> OTHER INFORMATION: Synthetic

<400> SEQUENCE: 5
gagaggcaac cacatcgtga                                         20

<210> SEQ ID NO 6
<211> LENGTH: 20
<212> TYPE: DNA
<213> ORGANISM: Artificial Sequence
<220> FEATURE:
<223> OTHER INFORMATION: Synthetic

<400> SEQUENCE: 6
ggccttcacg gcgatagaat                                         20

<210> SEQ ID NO 7
<211> LENGTH: 44
<212> TYPE: DNA
<213> ORGANISM: Artificial Sequence
<220> FEATURE:
<223> OTHER INFORMATION: Synthetic

<400> SEQUENCE: 7
cctcaaggag gggactcaca tccgagtgaa cttactaaac caca              44

<210> SEQ ID NO 8
<211> LENGTH: 14
<212> TYPE: PRT
<213> ORGANISM: Artificial Sequence
<220> FEATURE:
<223> OTHER INFORMATION: Synthetic

<400> SEQUENCE: 8

Leu Lys Glu Gly Thr His Ile Arg Val Asn Leu Leu Asn His
1               5                   10

<210> SEQ ID NO 9
<211> LENGTH: 11
<212> TYPE: DNA
<213> ORGANISM: Artificial Sequence
<220> FEATURE:
<223> OTHER INFORMATION: Synthetic

<400> SEQUENCE: 9 aggagggac t                                                   11

<210> SEQ ID NO 10
<211> LENGTH: 11
<212> TYPE: DNA
<213> ORGANISM: Artificial Sequence
<220> FEATURE:
<223> OTHER INFORMATION: Synthetic

<400> SEQUENCE: 10
aggagaggac t                                                  11
```

METHOD FOR TREATING AN AUDITORY NEUROPATHY SPECTRUM DISORDER

CROSS-REFERENCE TO RELATED APPLICATIONS

This application is the National Phase of PCT International Application No. PCT/US2019/053465 filed Sep. 27, 2019, which claims the benefit of prior U.S. Provisional Application Ser. No. 62/737,406 filed Sep. 27, 2018, the disclosure of which are incorporated herein in their entirety for all purposes.

FIELD OF THE INVENTION

The present invention relates to a method for treating an auditory neuropathy spectrum disorder.

BACKGROUND OF THE INVENTION

Hearing loss is the most common pediatric sensory defect: more than 1/1000 children are affected by severe to profound sensorineural hearing impairment (SNHI) [1]. Pediatric SNHI is composed of a plethora of disease entities. Among them, auditory neuropathy spectrum disorder (ANSD) is of special interest because of its unparalleled clinical manifestations. ANSD is not uncommon, accounting for approximately 7% of permanent childhood hearing loss and a significant (but as yet undetermined) proportion of adult impairment [2]. Patients with ANSD have various degrees of hearing loss with poor speech perception that is out of proportion to their hearing levels [3]. Audiologically, ANSD is characterized by the preservation of normal outer hair cell function as evidenced by the presence of otoacoustic emissions (OAEs) and/or cochlear microphonics (CM), whereas the transmission of the auditory signal to the brainstem is impaired as evidenced by abnormal sound-evoked potentials of auditory brainstem response (ABR), poor speech perception and the absence of acoustic reflexes [3-5]. The pathophysiology of ANSD has been proposed to involve an abnormal peripheral auditory system localized to the inner hair cells, the auditory nerve, or the synapse between them [6]. Etiologically, ANSD might be caused by environmental insults, including infection during pregnancy, prematurity, perinatal hypoxemia and neonatal hyperbilirubinemia [7, 8], or it might be the consequence of certain syndromes, such as Charcot-Marie-Tooth disease [9] or cri-du-chat syndrome [10]. The tendency of familial aggregation observed in some series suggests that genetic factors may also be involved in the pathogenesis [6-8]. It has been estimated that approximately 40% of ANSD cases may have a genetic basis [11].

It is desirable to develop a new method for treating an auditory neuropathy spectrum disorder.

BRIEF SUMMARY OF THE INVENTION

It was unexpectedly discovered in the present invention that an auditory neuropathy spectrum disorder can be efficiently treated through a gene therapy via a vector, such as a vector comprising an Adeno-associated virus (AAV), called as an "AAV vector" hereinafter.

The present invention provides a method for treating an auditory neuropathy spectrum disorder in a subject comprising transferring the gene of DFNB59 via an adeno-associated virus (AAV) vector to the subject.

In another aspect, the present invention provides a construct for delivering a transgene to a subject suffering from an auditory neuropathy spectrum disorder, which comprises a vector carrying an adeno-associated virus (AAV) and the gene of DFNB59 containing the G292R mutation.

In one example of the invention, the gene of DFNB59 containing the G292R mutation has the nucleotide sequence coding for the amino acid sequence of LKERTHIRVNLLNH as set forth in SEQ ID NO: 1.

In one preferred example of the invention, the gene of DFNB59 containing the G292R mutation has the nucleotide sequence of CCTCAAGGAG AGGACTCACA TACGCGT-TAA CTTACTAAAC CACA as set forth in SEQ ID NO: 2.

According to the invention, the construct for delivering a transgene to a subject suffering from an auditory neuropathy spectrum disorder may comprise a promoter selected from the group consisting of an Espin promoter, a PCDH15 promoter, a PTPRQ promoter and a TMHS (LHFPL5) promoter that directs expression of harmonin-a, harmonin-b, or harmonin-c polypeptide.

It is to be understood that both the foregoing general description and the following detailed description are exemplary and explanatory only and are not restrictive of the invention.

BRIEF DESCRIPTION OF THE SEVERAL VIEWS OF THE DRAWINGS

The drawings presenting the preferred embodiments of the present invention are aimed at explaining the present invention. It should be understood that the present invention is not limited to the preferred embodiments shown. The data in the figures and examples are shown as mean±standard deviation (SD). Significant differences are shown as follows: *$p<0.05$, ***$p<0.001$.

DETAILED DESCRIPTION OF THE INVENTION

Figure 1A:
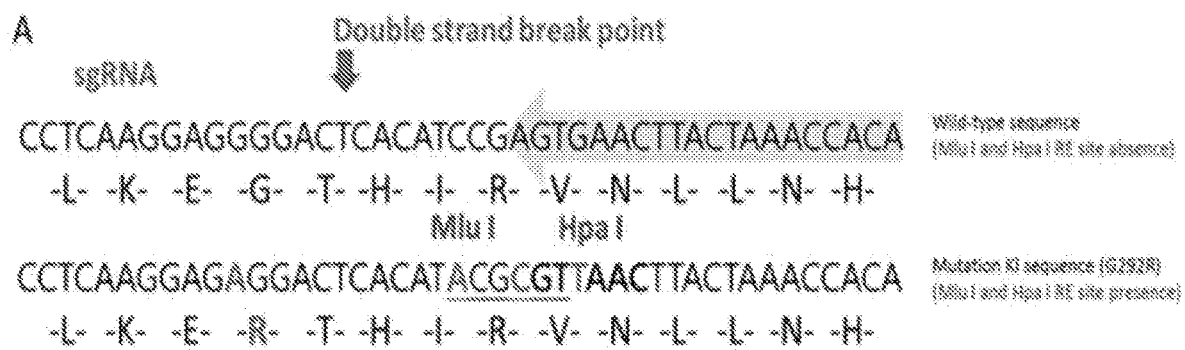
FIG. 1A (SEQ ID NOS: 7, 8, 2 and 1) provides the design of CRISPR/Cas9 genome editing for a transgenic mouse with the Pjvk p.G292R mutation using CRISPR/Cas9.

Unless otherwise defined herein, scientific and technical terms used herein have the meanings that are commonly understood by those of ordinary skill in the art.

1. Non-Syndromic Auditory Neuropathy Spectrum Disorder (ANSD)

Hearing loss is the most common pediatric sensory defect: more than 1/1000 children are affected by severe to profound sensorineural hearing impairment (SNHI) [1]. Pediatric SNHI is composed of a plethora of disease entities. Among them, auditory neuropathy spectrum disorder (ANSD) is of special interest because of its unparalleled clinical manifestations. ANSD is not uncommon, accounting for approximately 7% of permanent childhood hearing loss and a significant (but as yet undetermined) proportion of adult impairment [2]. Patients with ANSD have various degrees of hearing loss with poor speech perception that is out of proportion to their hearing levels [3]. Audiologically, ANSD is characterized by the preservation of normal outer hair cell function as evidenced by the presence of otoacoustic emissions (OAEs) and/or cochlear microphonics (CM), whereas the transmission of the auditory signal to the brainstem is impaired as evidenced by abnormal sound-evoked potentials of auditory brainstem response (ABR), poor speech perception and the absence of acoustic reflexes [3-5]. The pathophysiology of ANSD has been proposed to involve an abnormal peripheral auditory system localized to the inner hair cells, the auditory nerve, or the synapse between them [6].

Etiologically, ANSD might be caused by environmental insults, including infection during pregnancy, prematurity, perinatal hypoxemia and neonatal hyperbilirubinemia [7, 8], or it might be the consequence of certain syndromes, such as Charcot-Marie-Tooth disease [9] or cri-du-chat syndrome [10]. The tendency of familial aggregation observed in some series suggests that genetic factors may also be involved in the pathogenesis [6-8]. It has been estimated that approximately 40% of ANSD cases may have a genetic basis [11].

The hearing loss levels in patients with ANSD vary from mild to profound hearing loss, and their speech perception may be out of proportion to the audibility changes. In addition, patients with auditory neuropathy do not typically derive much benefit from hearing aids. Some of the patients are able to acquire speech and hearing without a hearing aid over time; some of them present well with hearing aids or cochlear implants (CIs); and still a part of them did not develop well in speech or hearing despite under CI use. These features lead to difficulties in the diagnosis and treatment for patients with ANSD in clinical practice.

2. DFNB59 Mutation and Non-Syndromic ANSD

Mutation in DFNB59 is a common cause of non-syndromic ANSD in humans. Delmaghani et al. identified mutations in the DFNB59 gene in four familial cases of ANSD [12]. Two missense mutations were identified in the families. The gene DFNB59 produces a protein the researchers named "pejvakin", which is expressed in the organ of Corti, the spiral ganglion and the neuronal cell bodies of the cochlear nuclei, superior olivary complex and the inferior colliculus of the afferent auditory pathway. The researchers believe pejvakin is crucial for auditory nerve signalling. Mutation in this gene appears to result in auditory neuropathy due to a disruption in neuronal signalling along the auditory pathway. Cochlear function is intact in these patients.

3. DFNB59 Mutation and Poor CI Outcome

We identified patients with mutations in 4 common deafness genes (namely GJB2, SLC26A4, the mitochondrial 12S rRNA gene, and OTOF) usually exhibit excellent long-term CI outcomes, probably because the effects of these mutations were confined to the inner ear and the function of the auditory nerve is spared. Based on the results of the clinical trial in multi-center studies in Taiwan, which enrolled more than 300 children with CIs. The purpose of the present study is to identify the genetic determinants of poor CI outcomes.

We identified genetic variants which are associated with poor CI outcomes in 7 (58%) of the 12 cases. Among the 12 cases, 3 cases were homozygous for the DFNB59 p.G292R variant. Mutations in the WFS1, GJB3, ESRRB, LRTOMT, MYO3A, and POU3F4 genes were detected in 7 (23%) of the 30 matched controls. The allele frequencies of DFNB59 variants were significantly higher in the cases than in the matched controls (both P<0.001). In the 3 CI recipients with DFNB59 variants, otoacoustic emissions were absent in both ears, and imaging findings were normal in all 3 implanted ears. It is believed that DFNB59 variant is associated with poor CI performance, yet children with DFNB59 variants might show clinical features indistinguishable from those of other typical pediatric CI recipients.

4. Adeno-Associated Virus (AAV)

The use of viral vectors for inner ear gene therapy is receiving increased attention for treatment of genetic hearing disorders. Most animal studies to date have injected viral suspensions into neonatal ears, via the round window membrane. Achieving transduction of hair cells, or sensory neurons, throughout the cochlea has proven difficult, and no studies showed an efficient transduction of sensory cells in adult ears while maintaining normal cochlear functions [13].

Adeno-associated virus (AAV) vectors have emerged as a gene-delivery platform with demonstrated safety and efficacy in a handful of clinical trials for monogenic disorders. However, limitations of the current generation vectors often prevent broader application of AAV gene therapy. Efforts to engineer AAV vectors have been hampered by a limited understanding of the structure-function relationship of the complex multimeric icosahedral architecture of the particle. To develop additional reagents pertinent to further our insight into AAVs, Luk H. Vandenberghe laboratory inferred evolutionary intermediates of the viral capsid using ancestral sequence reconstruction. In-silico-derived sequences were synthesized de novo and characterized for biological properties relevant to clinical applications [14]. This effort led to the generation of nine functional putative ancestral AAVs and the identification of Anc80, the predicted ancestor of the widely studied AAV serotypes 1, 2, 8, and 9, as a highly potent in vivo gene therapy vector for targeting liver, muscle, and retina. Recently, novel adeno-associated virus (AAV) serotypes, such as Anc80, have been confirmed as a promising delivery system for restoring the function of inner ear sensory cells [15]. However, the efficiency of these new AAVs in targeting other pathological changes of the auditory/vestibular pathways remains unclear.

In one preferred embodiment of the invention, the AAV vector is an AAV vector comprising an Anc80 capsid protein as provided in WO2017/100791 A1, also called as an AAV-Anc80 vector. The AAV-Anc80 vector was confirmed to be able to efficiently deliver nucleic acids to the inner ear, e.g., cochlea, particularly the inner and outer hair cells (IHCs and OHCs) in the cochlea, which is an attractive target for gene therapy approaches to intervene in hearing loss and deafness of various etiologies, most immediately monogenic forms of inherited deafness.

In one more preferred embodiment of the invention, the AAV vector is a synthetic inner ear hair cell targeting adeno-associated virus (AAV) vector, wherein the vector encodes a capsid having at least about 85% sequence identity to Anc80, and comprises a promoter selected from the group consisting of an Espin promoter, a PCDH15 promoter, a PTPRQ promoter and a TMHS (LHFPL5) promoter that directs expression of harmonin-a, harmonin-b, or harmonin-c polypeptide, as provided in WO2018/145111 A1.

5. Gene Therapy

Gene therapy, also called as human gene transfer, is the therapeutic delivery of nucleic acid into a patient's cells as a drug to treat disease. In the present invention, animal studies were conducted in the present invention to elucidate the pathogenetic mechanisms and to explore novel therapeutic approaches.

The invention is further illustrated by the following example, which should not be construed as further limiting.

EXAMPLE

I. Materials & Methods

1. Animals

Wild-type control mice were C57BL/6J and mice that carried mutant alleles of Pjvk were on a C57BL/6J background. All animal experiments were carried out in accordance with animal welfare guidelines and approved by the Institutional Animal care and Use Committee (IACUC) of National Taiwan University College of Medicine (approval no. 20160337).

2. Audiological and Vestibular Evaluations

For audiological evaluations, the mice were anesthetized with sodium pentobarbital (35 mg/kg) delivered intraperitoneally and placed in a head-holder within an acoustically and electrically insulated and grounded test room. We used an evoked potential detection system (Smart EP 3.90; Intelligent Hearing Systems, Miami, FL, USA) to measure the thresholds of the auditory brainstem response (ABR) in mice. Click sounds, as well as 8, 16, and 32 kHz tone bursts at various intensity, were generated to evoke ABRs in mice. The response signals were detected with subcutaneous needle electrodes. The active electrodes were inserted into the vertex and the ipsilateral retro-auricular region with a ground electrode on the back of the mice. For vestibular evaluations, mice were subjected to a battery of tests, including observation of their circling behavior, swimming test and a rotarod test (all performed at 8 weeks of age). The methodology of vestibular tests are described detailed in our previous study.

3. Inner Ear Morphology Studies

Tissues from the inner ears of mice were subjected to hematoxylin and eosin (H&E) staining, and the morphology of each sample was examined with a Leica optical microscope. Inner ears from adult mice were fixed by perilymphatic perfusion with 4% paraformaldehyde (PFA) in phosphate-buffered saline (PBS) through round window and a small fenestra in the apex of the cochlear bony capsule. Then, specimens were rinsed in PBS buffer and decalcified in 4% PFA with 0.35 M EDTA at 4° C. for 2 days. For light microscopy studies, the samples were dehydrated and embedded in paraffin. Subsequently, serial sections (7 mm) were stained with H&E. Whole-mount studies of mouse inner ear specimens were performed as previously described with some minor modifications. Briefly, after perfusion with 4% PFA, the cochleae were postfixed in the same solution for 2 h at room temperature and washed in PBS. The samples were permeabilized in 1% Triton X-100 for 30 min and washed with PBS, followed by overnight incubation at 4° C. in the blocking solution. The tissues were then stained with rhodamine-phalloidin (1:100 dilution; Molecular Probes, Eugene, OR, USA). After washing in PBS, the tissues were mounted using the ProLong Antifade kit (Molecular Probes, Eugene, OR, USA) for 20 min at room temperature. Images of the tissues were obtained using a laser scanning confocal microscope (Zeiss LSM 880; Germany).

4. Expression of Pejvakin

For pejvakin expression experiments, we prepared tissue sections from the inner ears of $Pjvk^{WT/WT}$ mice and $Pjvk^{G292R/G292R}$ mice Tissue sections mounted on silane-coated glass slides were then deparaffinized in xylene and rehydrated in ethanol. After antigen heat retrieval (500 W microwave oven, in 10 mM citric buffer, pH 6.0, for 20 min), the slides were incubated overnight at 4° C. with primary antibodies in PBS and Tween (PBST) (rabbit anti-pjvk, 1:100 [NB110-75015]; mouse anti-Myosin VIIa, 1:100 [C-5]; Santa Cruz Biotechnology, Santa Cruz, CA, USA; rabbit anti-parvalbumin, 1:100 [ab12427]). The slides were then washed and incubated for 1 h at 25° C. with appropriate secondary antibodies at a 1:1000 dilution in PBST. After incubation, the slides were washed with PBST and mounted with the ProLong Antifade kit at 25° C. Images were obtained using the laser scanning confocal microscope (Zeiss LSM 880; Germany).

5. Viral Vector Generation

The Anc80L65 vector was constructed and obtained from the Gene Transfer Vector Core at the Massachusetts Eye and Ear Infirmary. The Anc80L65 vector contained the predominant longest isoform of Pjvk cDNA (NCBI accession no. 001080711.2) and was driven by a cytomegalovirus promoter. The carrying capacity of this vector was estimated to be about 4,500 bp. The predominant longest isoform of Pjvk cDNA is 1,059 bp and could fit within the Anc80L65 vector.AAV2/Anc80L65. CMV.WPRE.bGH: $2.52 \times 10^{12}$ gc/ml (MEEI); AAV2/Anc80L65. AAP.CMV.DFNB59 FF2A EGFP WPRE.bGH: $1.51 \times 10^{12}$ gc/ml (MEEI)

6. Round Window Membrane (RWM) Injection

Mice were anesthetized by hyperthermia on ice. RWM was performed by preauricular incision to expose the cochlear bulla. Glass micropipettes (4878, WPI) were pulled with a micropipette puller (P87, Sutter instruments) to a final OD of ~10 μm. Needles held by a Nanoliter 2000 micromanipulator (WPI) were used to manually deliver the AAV complexes into the scala tympani, which allows access to inner ear cells. The volume for each injection was 0.3 μL with a total volume of 0.9 μl per cochlea. The release rate was 0.3 μl/min, controlled by MICRO4 microinjection controller (WPI).

7. Quantitative Real Time PCR

RNA levels was assessed from mouse tissue collected at P7 post-treatment. RNA was isolated from the cochlea using TRIzol reagent (Life Technologies, Carlsbad, CA) and total RNA was reverse transcribed into cDNA using Revert Aid First Stand cDNA Synthesis kit (thermo scientific, LOT00658136), and then amplified using SYBR Green Mix (thermo scientific, LOT00651735). The primers for these genes were as follows: GAPDH, 5'-CCTGCACCAC-CAACTGCTTA-3' (forward) (SEQ ID NO: 3) and 5'-GGC-CATCCACAGTCTTCTGAG-3' (reverse) (SEQ ID NO: 4); PJVK, 5'-GAGAGGCAACCACATCGTGA-3' (forward) (SEQ ID NO: 5) and 5'-GGCCTTCACGGCGATAGAAT-3' (reverse) (SEQ ID NO: 6). The PCR parameters were as Follows: pre-incubation at 95° C. for 5 minutes, followed by 40 cycles of amplification at 95° C. for 20 seconds, annealing at 95° C. for 5 seconds and 60° C. for 1 minute, and cooling at 40° C. for 30 seconds. The mRNA levels were expressed as the relative copy number of each target mRNA to GAPDH for each sample, and the cycle threshold (Ct) of the control group was normalized to 1.

8. Data Analyses

Data are presented as mean±SD, unless indicated otherwise. A p value of <0.05 was considered statistically significant. All analyses were performed using SPSS/Windows software 15.0 (SPSS Science, Chicago, IL, USA).

II. Results

1. Generation of Mice with the Pjvk p.G292R Mutation Using CRISPR/Cas9

Figure 1B:
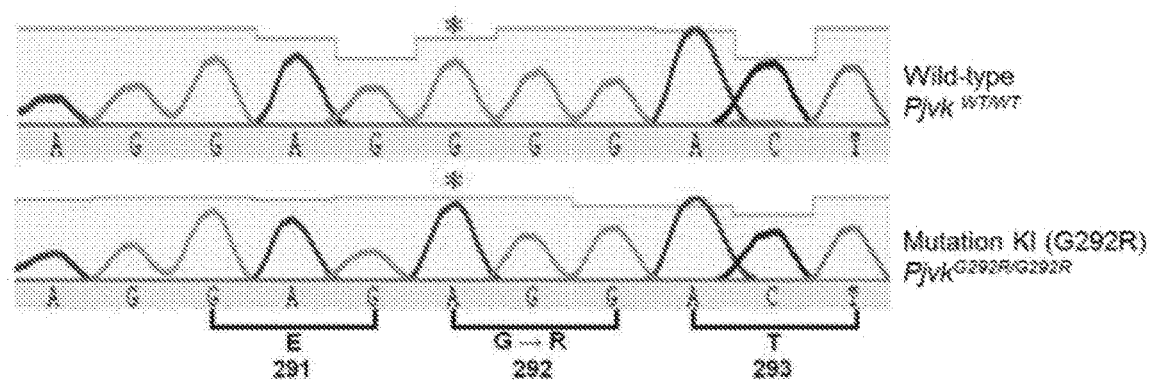
FIG. 1B (SEQ ID NOS: 9 and 10) shows the DNA sequencing of the wild-type $Pjvk^{WT/WT}$ and the mutation KI (G292R) $Pjvk^{G292R/G292R}$ mice. GG wild type genotype; AA homozygous mutation, mutation site.

Transgene mice was generated by technology of CRISPR (clustered regularly interspaced short palindromic repeat)-associated RNA-guided endonuclease Cas9, which was identified from the microbial adaptive immune system, used to modify the mammalian genome in high efficiency and precision recently. The CRISPR/Cas9 system and C57BL/6 mice were combined to mutate the Pjvk genes, generating $Pjvk^{G292R/G292R}$ mouse line. Oligonucleotides of 20 residues serving as specific guiding RNAs (gRNAs) were developed to target exon 6 of gene Pjvk in mouse (FIG. 1A). The gRNA and CRISPR/Cas9 RNA were microinjected into the C57BL/6 mouse zygotes to generate founders. Two male founder mice were obtained, each obtained the p.G292R mutation in exon 6 of the Pjvk gene. After germline transmission of the targeted mutation allele, we produced the congenic $Pjvk^{+/G292R}$ mouse line used in this study by repeated backcrossing into the C57BL/6 inbred strain for 6-10 generations. DNA from tail of young mice (before P8) is optimal for genotyping. The integrity of DNA was evaluated by agarose-gel electrophoresis and polymerase chain reaction. PCR products were digested using the HpaI. The expected 492 bp was detected in the $Pjvk^{WT/WT}$ mice, whereas 314 bp and 178 bp fragments were detected in the $Pjvk^{G292R/G292R}$ mice (FIG. 1B). DNA sequencing of $Pjvk^{WT/WT}$ and $Pjvk^{G292R/G292R}$ mice (FIG. 1C).

2. Audiological and Vestibular Phenotypes

Figure 2A:
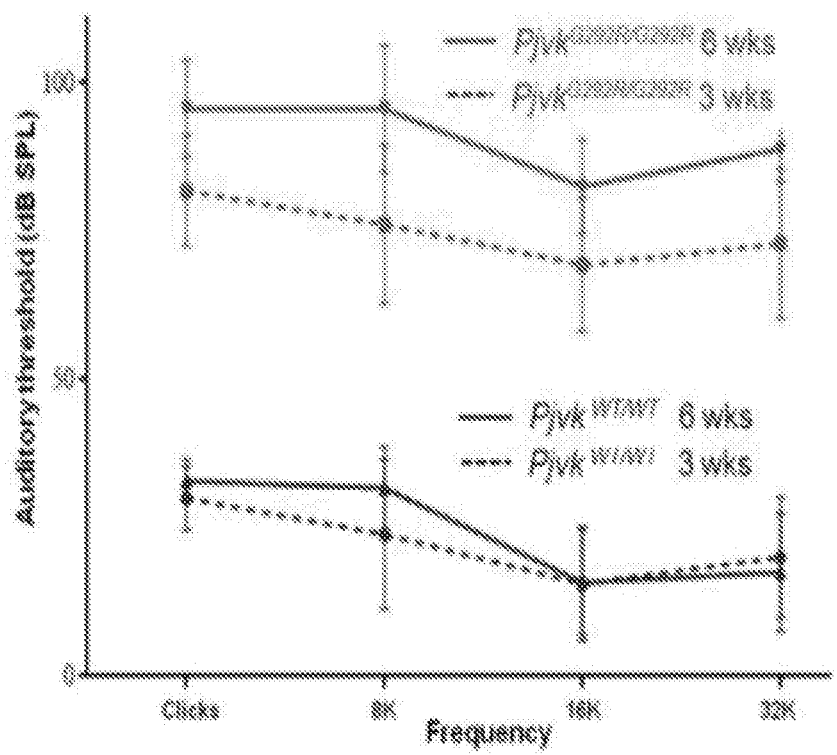
FIG. 2A shows the auditory thresholds and vestibular phenotypes of $Pjvkw^{WT/WT}$ and $Pjvk^{G292R/G292R}$ mice, wherein ABR thresholds were measured in 3-week-old and 6-week-old mice. $Pjvk^{G292R/G292R}$ mice (red) showed progressive severe hearing loss as compared to $Pjvk^{WT/WT}$ (blue) at all frequencies (n=10 for each group; thresholds expressed in mean±SD).
Figure 2B:
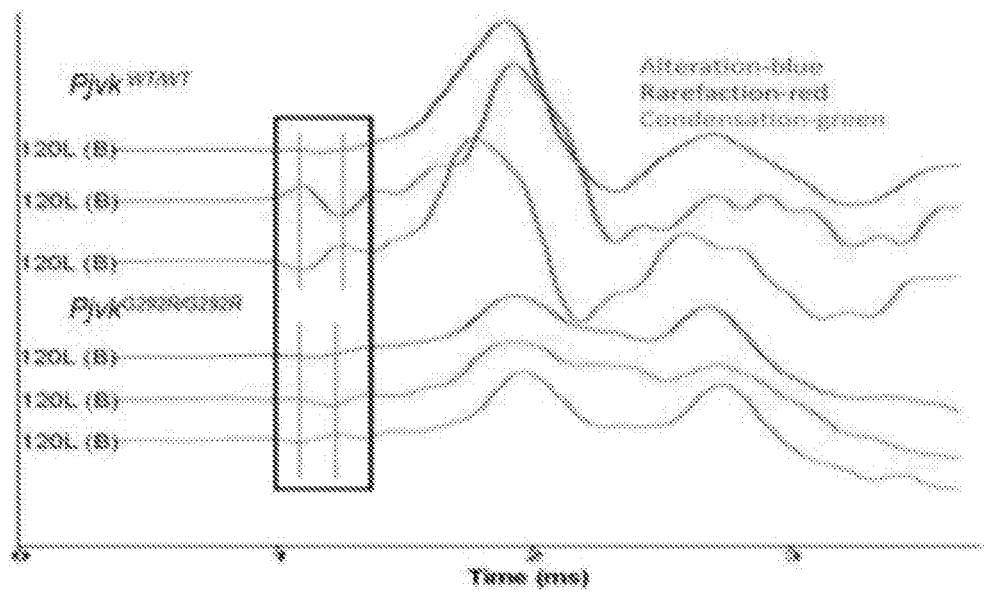
FIG. 2B shows that the electrocochleographic responses evoked by condensation (green) and rarefaction (red) clicks recorded from both of the $Pjvk^{WT/WT}$ and $Pjvk^{G292R/G292R}$ mice at maximum stimulation intensity (120 dB SPL); and the $Dfnb59^{G292R/G292R}$ mice showed low CM amplitude as compared to $Pjvk^{WT/WT}$ mice; the law-amplitude oscillatory activity following negative deflection, corresponding to neural response, shows an opposite phase from condensation to rarefaction.
Figures 2C, 2D:
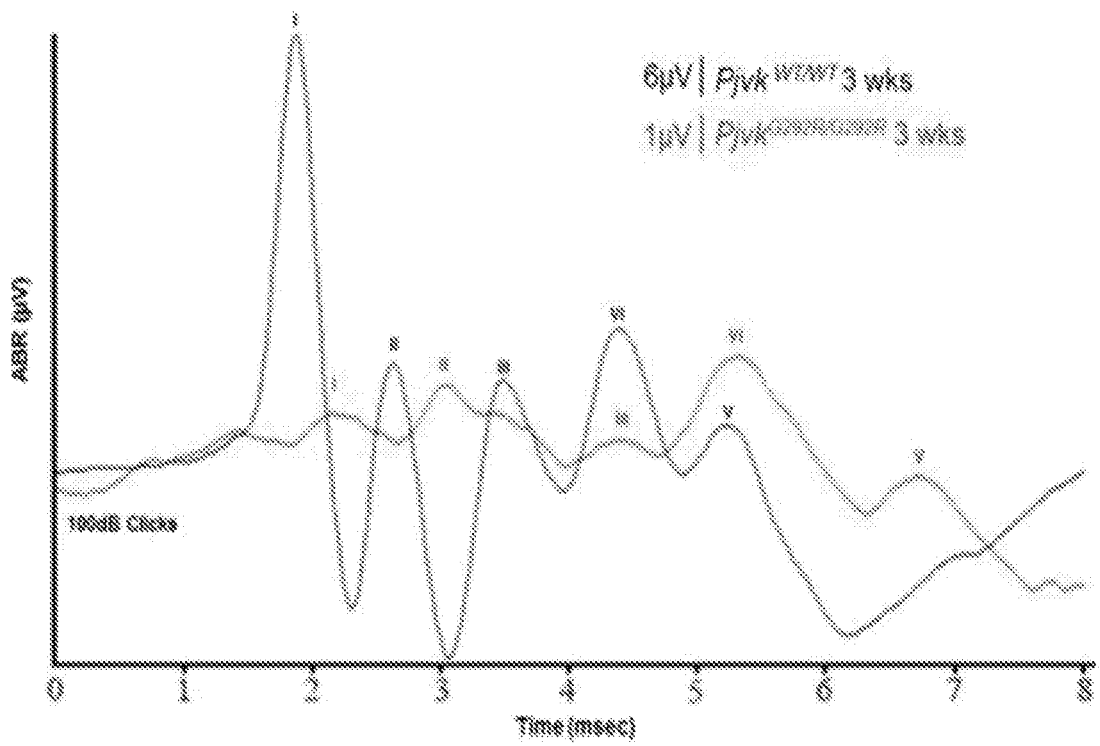
FIG. 2C shows that the ABR traces (clicks-stimuli) at 100 dB SPL were superimposed ($Pjvk^{WT/WT}$ black; $Pjvk^{G292R/G292R}$ red), and that wave I-V in 3-week-old $Pjvk^{G292R/G292R}$ mice showed increased latencies and reduced peak amplitudes.
FIG. 2D provides the data of the absolute and interpeak latencies of ABR waves in 3-week-old $Pjvk^{WT/WT}$ and $Pjvk^{G292R/G292R}$ mice.
Figure 2E:
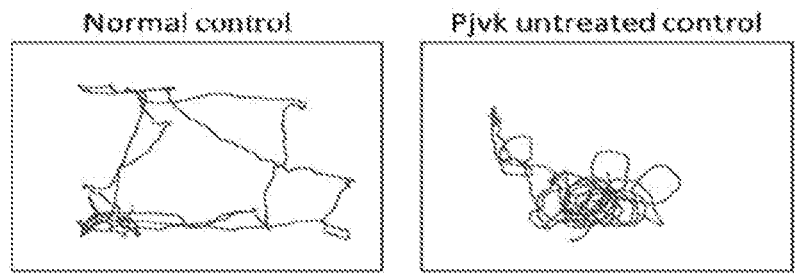
FIG. 2E provides the images of the representative track from $Pjvk^{WT/WT}$ and $Pjvk^{G292R/G292R}$ demonstrating that $Pjvk^{G292R/G292R}$ mice that did exhibit circling at P60.
Figure 2F:
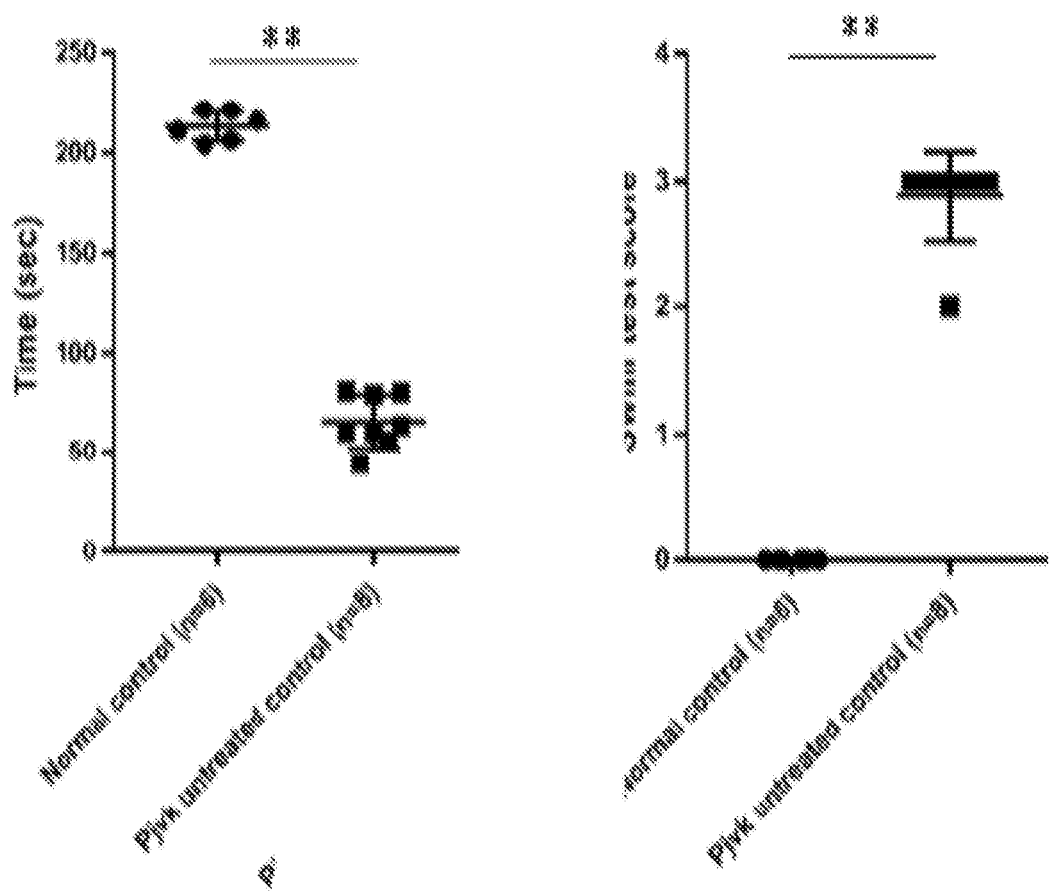
FIG. 2F provides the duration of time each animal remained balanced on the rotarod apparatus as recorded, wherein the testing was performed between P60 and P90, and a well-established swim scoring system was used to measure swim performance, with 0 representing normal swimming and 3 representing underwater tumbling requiring immediate rescue (Mean±SEM for each subject group. **$p<0.01$).

Wild-type mice (i.e., $Pjvk^{WT/WT}$) and homozygous mice (i.e., $Pjvk^{G292R/G292R}$) (n=10 each) were subjected to audiological evaluations at 3-week-old and 6-week-old mice. $Pjvk^{G292R/G292R}$ mice showed progressive severe hearing loss as compared to $Pjvk^{WT/WT}$ mice at all frequencies (FIG. 2A). Electrocochleographic responses evoked by condensation and rarefaction clicks recorded from both $Pjvk^{WT/WT}$ and $Pjvk^{G292R/G292R}$ mice at maximum stimulation intensity (120 dB SPL). The $Dfnb59^{G292R/G292R}$ mice showed low cochlear microphonic (CM) amplitude as compared to $Pjvk^{WT/WT}$ mice (FIG. 2B). Analysis of the ABR waveforms in 3-week-old mice revealed additional defects. An overlay of ABR traces recorded at 100 dB SPL demonstrated that the absolute latencies of all five ABR waveforms were significantly augmented in 3-week-old animals, indicating the presence of retrocochlear lesions (FIG. 2C & FIG. 2D). Together, these observations suggest that $Pjvk^{G292R/G292R}$ may be an auditory neuropathy spectrum disorder (ANSD) animal model for research. Total 14 mice, including $Pjvk^{WT/WT}$ mice that did not exhibit circling and $Pjvk^{G292R/G292R}$ mice that did exhibit circling at P60, were subjected to vestibular evaluations. $Pjvk^{G292R/G292R}$ mice revealed impaired balancing ability compared to normal control mice (FIG. 2E & FIG. 2F).

3. Inner Ear Morphology

Examination of the inner ear morphology from P30, P60 and P90 mice revealed progressive degeneration of hair cells and spiral ganglion neurons in $Pjvk^{G292R/G292R}$ mice. It was observed in the Cochlear pathology in the $Pjvk^{G292R/G292R}$ mice that the degeneration of hair cells and spiral ganglion neurons and degeneration of inner and outer hair cells in the organ of Corti were confirmed by fluorescence confocal microscopy.

4. Immunolocalization and Expression of Pejvakin

We then examined the expression of pejvakin in the cochlea of Pjvk$^{WT/WT}$ mice and Pjvk$^{G292R/G292R}$ mice by immunolocalization. In both of the strains of the mice, pejvakin was normally distributed in the hair cells and spiral ganglion neurons, indicating that the expression of pejvakin in the hair cells and cell bodies of all spiral ganglion neurons was not affected by the p.G292R (c.874 G>A) mutation in mice.

5. Gene Therapy 5.1 PJVK Expression in the Inner Ear

Figure 3:
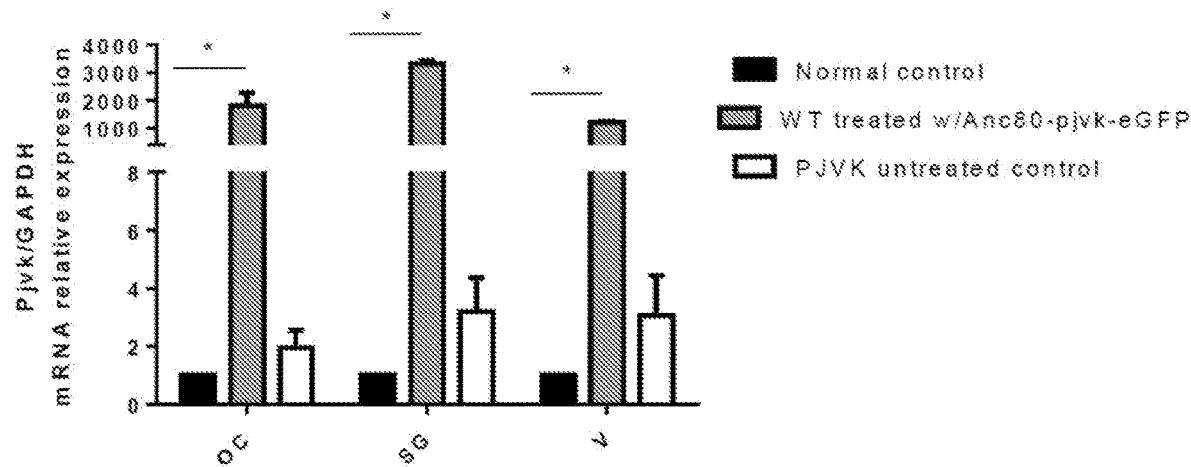
FIG. 3 shows the results of qPCR after treatment Anc80-Pjvk at P10, including the Pjvk mRNA expression in each region of the inner ear by quantitative rtPCR; wherein no Pjvk mRNA expression was detected in the untreated mice (the bars represent mean Pjvk mRNA expression levels against Ref mRNA expression levels; organ of Corti; OC, spiral ganglion; SG, vestibule; V. *$p<0.05$).

We delivered Anc80-Pjvk into the inner ear of Pjvk$^{WT/WT}$ mice and Pjvk$^{G292R/G292R}$ mice at P0-P3. We confirmed PJVK gene expression by quantitative real time PCR. Each tissue (the organ of Corti; OC, spiral ganglion; SG, vestibule; V) was collected at P7 after treatment in Pjvk$^{WT/WT}$ mice and Pjvk$^{G292R/G292R}$ mice. Relative expression of PJVK mRNA in each sample revealed that PJVK gene was expressed in the treated Pjvk$^{WT/WT}$ mice and Pjvk$^{G292R/G292R}$ mice, while PJVK gene was not detectable in the untreated mice (FIG. 3). There were no significant differences in relative PJVK expression level in among Pjvk$^{WT/WT}$ mice and Pjvk$^{G292R/G292R}$ mice in the treated inner ear. Furthermore, it was found in the Pjvk$^{G292R/G292R}$ mice cochlea that received Anc80-Pjvk gene therapy at P2, PJVK-EGFP was detectable at adult mice (P60) in the organ of Corti in cochlear, the saccule, the utricle, the semicircular canals, and the spiral ganglion neurons by whole mount study.

5.2 Anc80-PJVK Restores Audiovestibular Functions in Pjvk$^{G292R/G292R}$ Mice

Figure 4A:
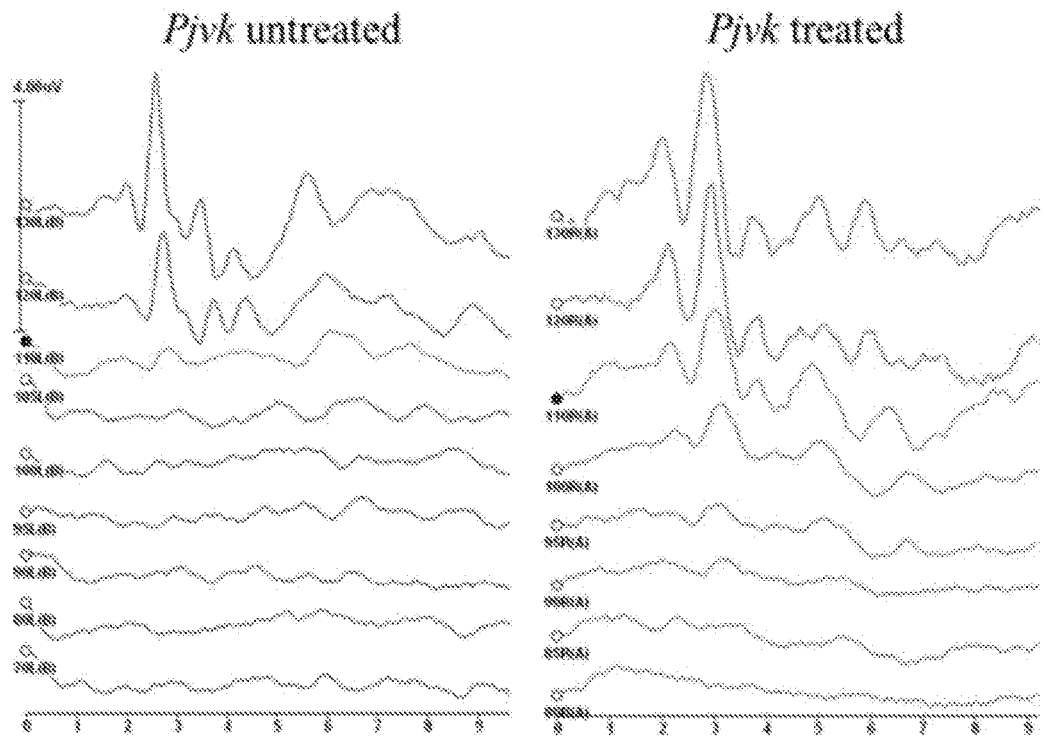
FIG. 4A provides the results of the Anc80-Pjvk gene therapy improves hearing in Pjvk mice, wherein the representative ABR recordings from a Pjvk untreated control (Pjvk$^{G292R/G292R}$, no gene therapy), and a Pjvk$^{G292R/G292R}$ that received Anc80-Pjvk gene therapy. In 8 of 29 Pjvk mutant mice, measurable ABR thresholds were obtained after Anc80-Pjvk gene therapy.
Figure 4B:
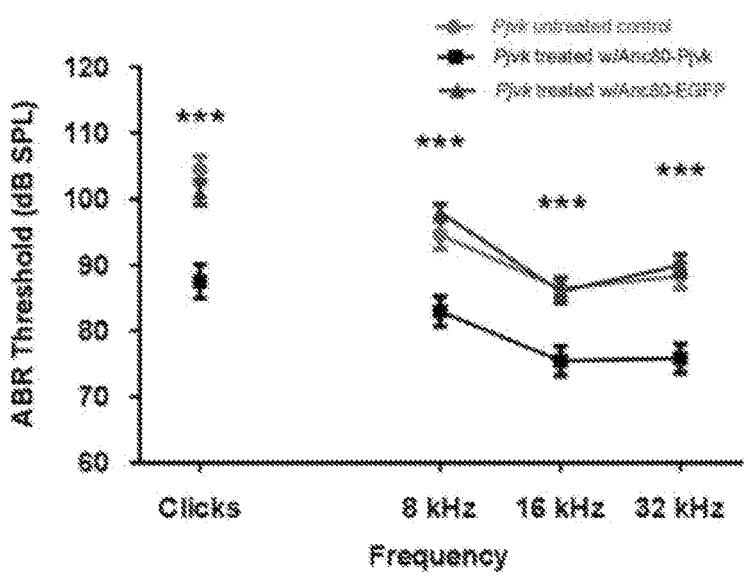
FIG. 4B showed the ABR thresholds at the four measured frequencies (Clicks, 8, 16, and 32 kHz), wherein the ABR thresholds from the eight Pjvk mice that had improved hearing are shown black lines.
Figure 4C:
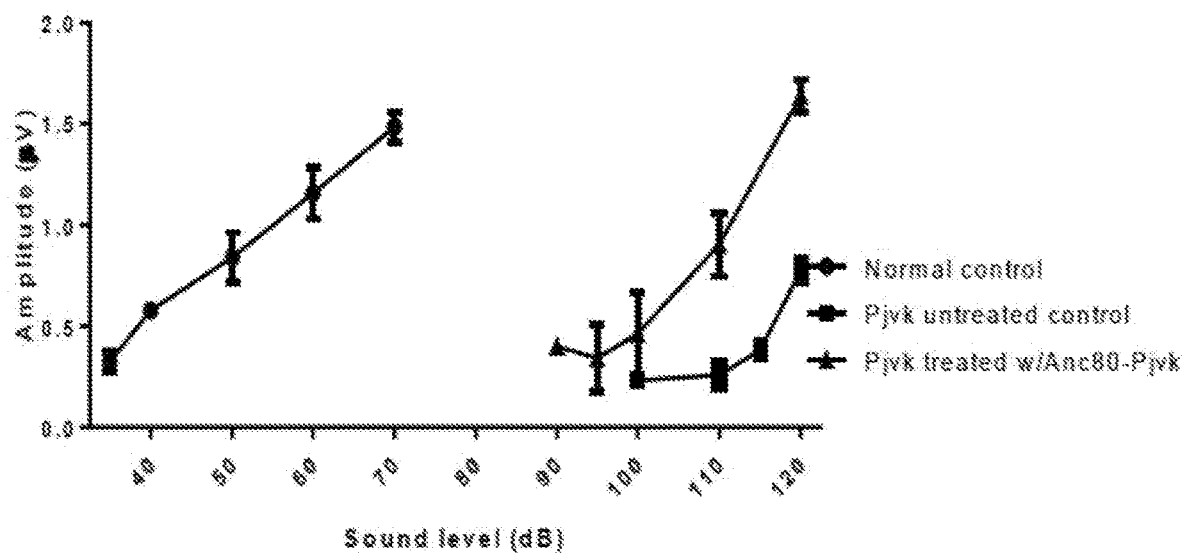
FIG. 4C shows Peak 1 amplitudes measured from clicks ABR waveforms, as shown in b, for eight Pjvk$^{G292R/G292R}$ mice injected with Anc80-Pjvk.
Figure 5:
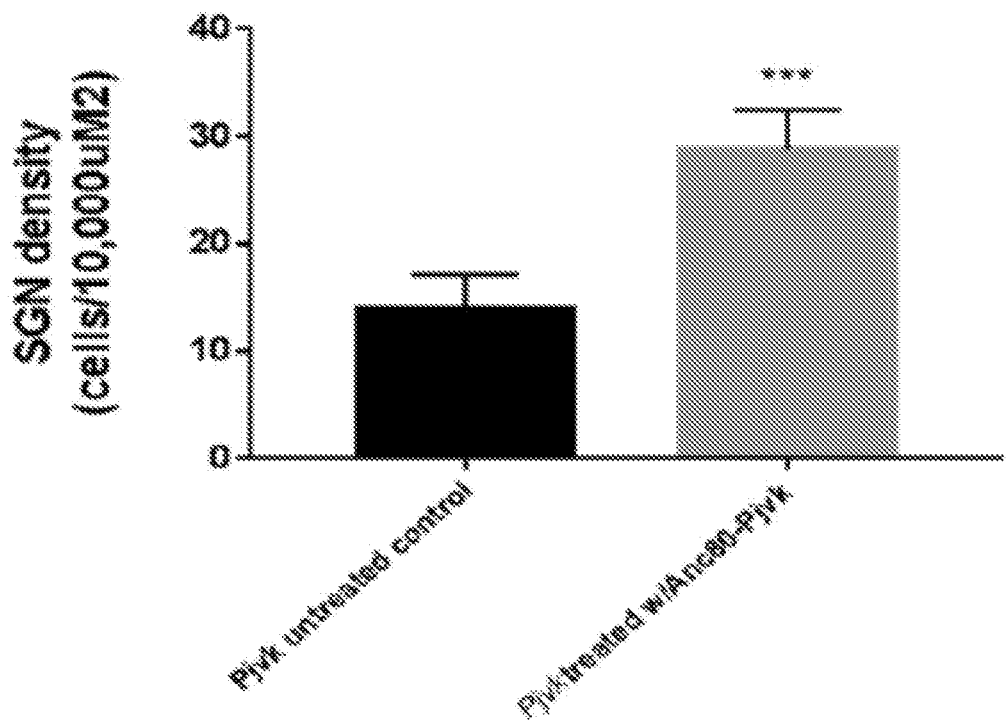
FIG. 5 shows the efficacy of the Anc80-Pjvk gene therapy, wherein the spiral ganglion neurons degeneration were reduced in Pjvk mice; wherein the SGN cell count densities were measured by light microscopy for the Pjvk untreated control and Pjvk treated w/Anc80-Pjvk; Magnification: 20×1.6. Lower panels show bar graphs representing the SGN cell density (Mean±SEM for each subject group; ***$p<0.0001$).
Figure 5:
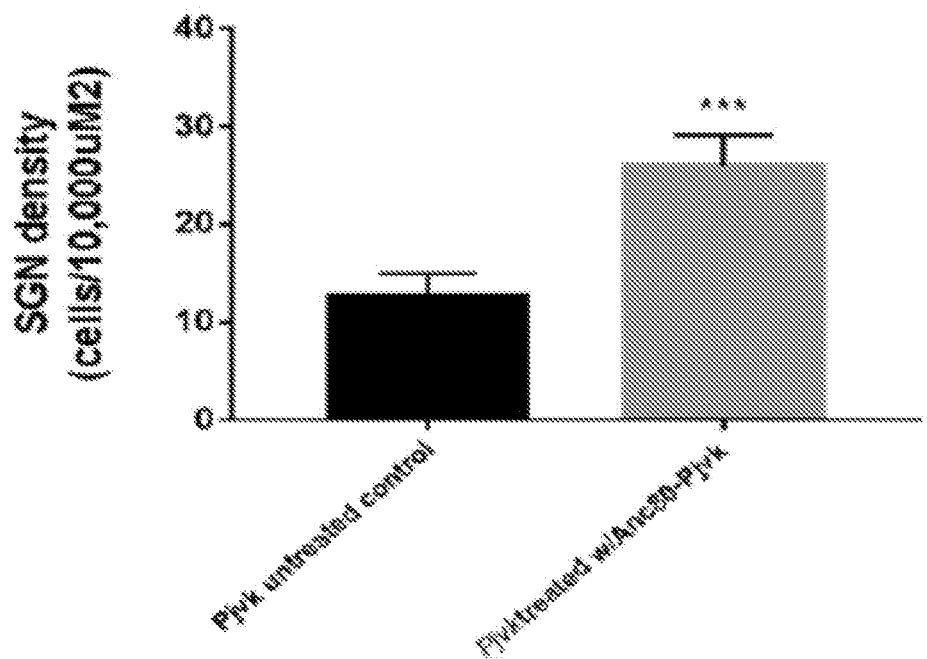

To investigate the extent of recovery from Anc80-Pjvk at the level of the whole cochlea, we measured auditory brainstem responses (ABRs) beginning at P28. Pjvk$^{G292R/G292R}$ mice were injected at P1-P3, and cochlear function was assessed at P36 to P45. FIG. 4A shows representative families of ABR waveforms recorded in response to clicks of varying sound intensity. The ABR thresholds of P36 to P45 Anc80-Pjvk treated Pjvk$^{G292R/G292R}$ (n=8) were about 15 dB lower than those of Anc80-EGFP treated Pjvk$^{G292R/G292R}$ (n=8) and untreated Pjvk$^{G292R/G292R}$ (n=13) mice across all frequencies tested (t test, p<0.001 for all comparisons) (FIG. 4B). ABR peak I amplitudes were generally monotonic increasing functions of sound level (FIG. 4C), while peak I latencies were monotonic decreasing functions of sound intensity (FIG. 4D), both consistent with curves of normal hearing mice. We also injected Anc80-EGFP into the inner ears of four Pjvk$^{G292R/G292R}$ mice and found no change in auditory function relative to untreated Pjvk$^{G292R/G292R}$ controls, which suggested the viral capsid EGFP overexpression had no detrimental effect on inner ear function. In the examination of the inner ear spiral ganglion neurons (SGN) morphology, SGN cell count densities were measured by light microscopy for the Pjvk untreated control and Pjvk treated w/Anc80-Pjvk (Magnification: 20×1.6). In the examination of the inner ear morphology, the Pjvk$^{G292R/G292R}$ mice cochlea that received Anc80-Pjvk gene therapy at P2 was examined at P60. It was found in the SGN morphology at P90 that the treated mice revealed reduces spiral ganglion neurons degeneration as compare to untreated mice (FIG. 5, Lower panels show bar graphs representing the SGN cell density).

Figure 6:
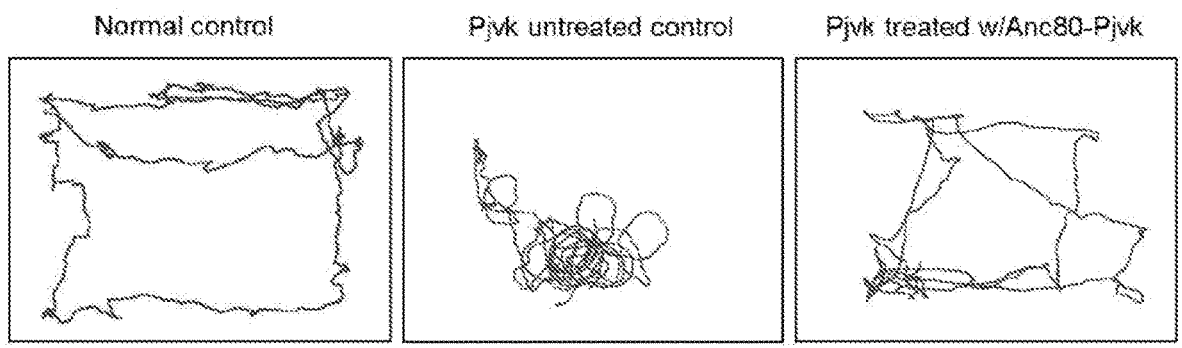
FIG. 6 shows the results of the Anc80-Pjvk gene therapy; wherein the circling behavior was reduced in the Pjvk mice; wherein the representative track from a Pjvk untreated control (Pjvk$^{G292R/G292R}$, no gene therapy), and a Pjvk$^{G292R/G292R}$ that received Anc80-Pjvk gene therapy, demonstrating that Anc80-Pjvk gene therapy significantly reduced circling behavior in Pjvk mice.

Furthermore, none of the Anc80-Pjvk treated Pjvk$^{G292R/G292R}$ mice revealed vestibular deficits until 12 months (data not shown). Anc80-Pjvk treated Pjvk$^{G292R/G292R}$ mice performance on the rotorod test and swimming test were also normal as compare to normal control mice. As shown in FIG. 6 providing a representative track from a Pjvk untreated control (Pjvk$^{G292R/G292R}$, no gene therapy), and a Pjvk$^{G292R/G292R}$ that received Anc80-Pjvk gene therapy, it was confirm that the Anc80-Pjvk gene therapy significantly reduced circling behavior in Pjvk mice.

Figure 7A:
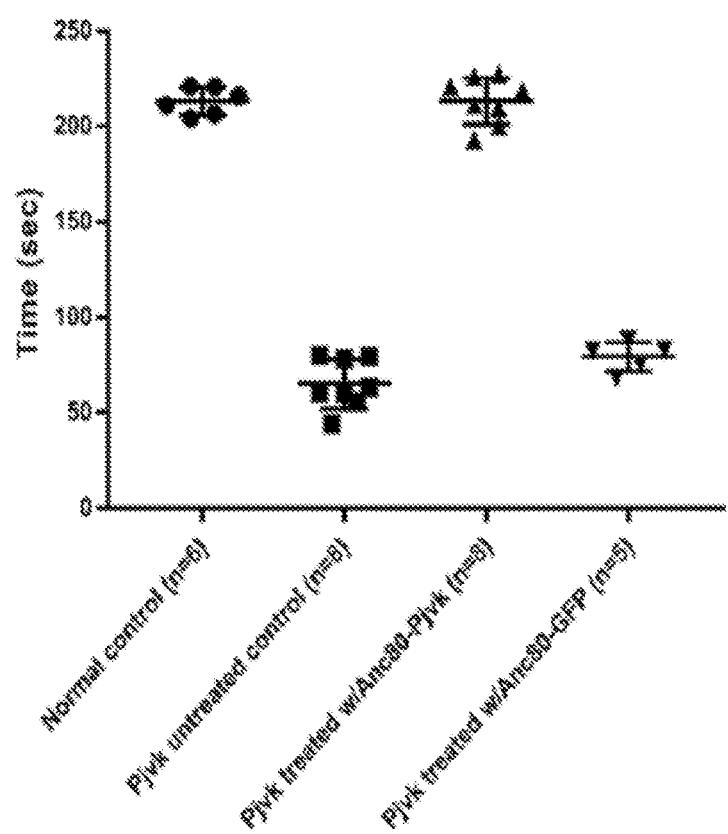
FIG. 7A shows the efficacy of the Anc80-Pjvk gene therapy, wherein the swimming and rotarod performance were improved in the Pjvk mice; wherein the duration of time each animal remained balanced on the rotarod apparatus was recorded and the testing was performed between P60 and P90.
Figures 7B, 7C:
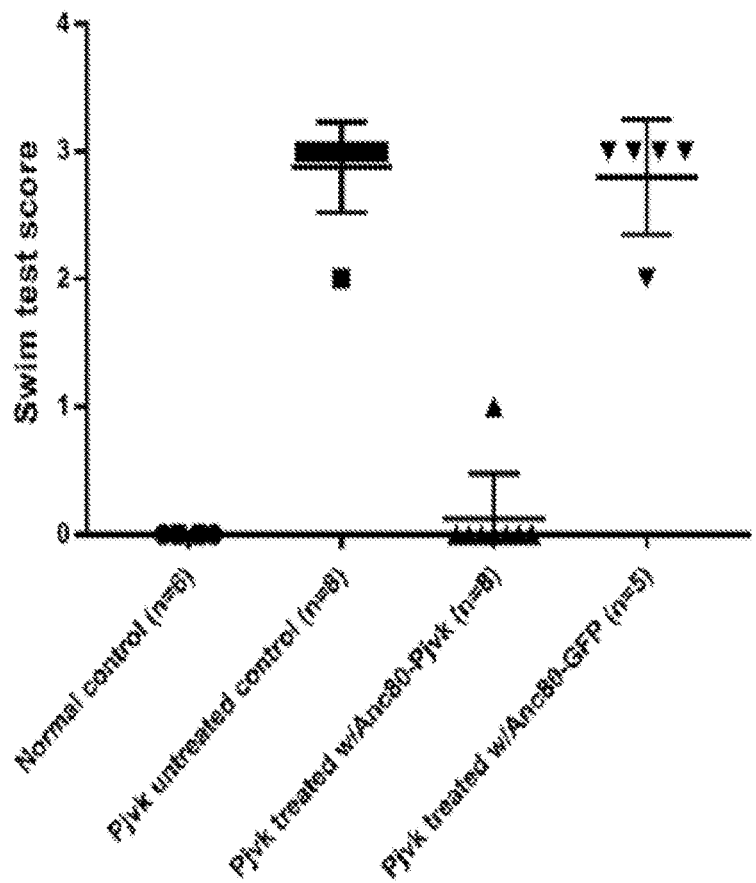
FIG. 7B shows a well-established swim scoring system was used to measure swim performance, with 0 representing normal swimming and 3 representing underwater tumbling requiring immediate rescue. Testing was performed between P60 and P90 (Mean±SEM for each subject group).
FIG. 7C provides a comparison of vestibular features according to the genotypes and the circling behavior.

It was also confirmed that the Anc80-Pjvk gene therapy improved swimming and rotarod performance in Pjvk mice. As shown in FIG. 7A, the duration of time each animal remained balanced on the rotarod apparatus was recorded. Testing was performed between P60 and P90. In addition, a well-established swim scoring system was used to measure swim performance, with 0 representing normal swimming and 3 representing underwater tumbling requiring immediate rescue (FIG. 7B). A comparison of vestibular features according to the genotypes and the circling behavior was also provided in FIG. 7C.

While the present invention has been disclosed by way preferred embodiments, it is not intended to limit the present invention. Any person of ordinary skill in the art may, without departing from the spirit and scope of the present invention, shall be allowed to perform modification and embellishment. Therefore, the scope of protection of the present invention shall be governed by which defined by the claims attached subsequently.

REFERENCE

[1] J. B. Nadol, Jr., Hearing loss, N Engl J Med 329(15) (1993) 1092-102.

[2] G. Rance, Auditory neuropathy/dys-synchrony and its perceptual consequences, Trends Amplif 9(1) (2005) 1-43.

[3] A. Starr, T. W. Picton, Y. Sininger, L. J. Hood, C. I. Berlin, Auditory neuropathy, Brain 119 (Pt 3) (1996) 741-53.

[4] G. Rance, D. E. Beer, B. Cone-Wesson, R. K. Shepherd, R. C. Dowell, A. M. King, F. W. Rickards, G. M. Clark, Clinical findings for a group of infants and young children with auditory neuropathy, Ear Hear 20(3) (1999) 238-52.

[5] M. Rodriguez-Ballesteros, R. Reynoso, M. Olarte, M. Villamar, C. Morera, R. Santarelli, E. Arslan, C. Meda, C. Curet, C. Volter, M. Sainz-Quevedo, P. Castorina, U. Ambrosetti, S. Berrettini, K. Frei, S. Tedin, J. Smith, M. Cruz Tapia, L. Cavalle, N. Gelvez, P. Primignani, E. Gomez-Rosas, M. Martin, M. A. Moreno-Pelayo, M. Tamayo, J. Moreno-Barral, F. Moreno, I. del Castillo, A multicenter study on the prevalence and spectrum of mutations in the otoferlin gene (OTOF) in subjects with nonsyndromic hearing impairment and auditory neuropathy, Hum Mutat 29(6) (2008) 823-31.

[6] A. Starr, Y. S. Sininger, H. Pratt, The varieties of auditory neuropathy, J Basic Clin Physiol Pharmacol 11(3) (2000) 215-30.

[7] D. Beutner, A. Foerst, R. Lang-Roth, H. von Wedel, M. Walger, Risk factors for auditory neuropathy/auditory synaptopathy, ORL J Otorhinolaryngol Relat Spec 69(4) (2007) 239-44.

[8] C. Madden, M. Rutter, L. Hilbert, J. H. Greinwald, Jr., D. I. Choo, Clinical and audiological features in auditory neuropathy, Arch Otolaryngol Head Neck Surg 128(9) (2002) 1026-30.

[9] H. Perez, J. Vilchez, T. Sevilla, L. Martinez, Audiologic evaluation in Charcot-Marie-Tooth disease, Scand Audiol Suppl 30 (1988) 211-3.

[10] D. Swanepoel, Auditory pathology in cri-du-chat (5p−) syndrome: phenotypic evidence for auditory neuropathy, Clin Genet 72(4) (2007) 369-73.

[11] V. K. Manchaiah, F. Zhao, A. A. Danesh, R. Duprey, The genetic basis of auditory neuropathy spectrum disorder (ANSD), Int J Pediatr Otorhinolaryngol 75(2) (2011) 151-8.

[12] S. Delmaghani, F. J. del Castillo, V. Michel, M. Leibovici, A. Aghaie, U. Ron, L. Van Laer, N. Ben-Tal, G. Van Camp, D. Weil, F. Langa, M. Lathrop, P. Avan, C. Petit, Mutations in the gene encoding pejvakin, a newly identified protein of the afferent auditory pathway, cause DFNB59 auditory neuropathy, Nat Genet 38(7) (2006) 770-8.

[13] J. Suzuki, K. Hashimoto, R. Xiao, L. H. Vandenberghe, M. C. Liberman, Cochlear gene therapy with ancestral AAV in adult mice: complete transduction of inner hair cells without cochlear dysfunction, Sci Rep 7 (2017) 45524.

[14] E. Zinn, S. Pacouret, V. Khaychuk, H. T. Turunen, L. S. Carvalho, E. Andres-Mateos, S. Shah, R. Shelke, A. C. Maurer, E. Plovie, R. Xiao, L. H. Vandenberghe, In Silico Reconstruction of the Viral Evolutionary Lineage Yields a Potent Gene Therapy Vector, Cell Rep 12(6) (2015) 1056-68.

[15] L. D. Landegger, B. Pan, C. Askew, S. J. Wassmer, S. D. Gluck, A. Galvin, R. Taylor, A. Forge, K. M. Stankovic, J. R. Holt, L. H. Vandenberghe, A synthetic AAV vector enables safe and efficient gene transfer to the mammalian inner ear, Nat Biotechnol 35(3) (2017) 280-284.

[16] Y. C. Lu, C. C. Wu, W. S. Shen, T. H. Yang, T. H. Yeh, P. J. Chen, I. S. Yu, S. W. Lin, J. M. Wong, Q. Chang, X. Lin, C. J. Hsu, Establishment of a Knock-In Mouse Model with the SLC26A4 c.919-2A>G Mutation and Characterization of Its Pathology, Plos One 6(7) (2011).

What is claimed is:

1. A method for treating an auditory neuropathy spectrum disorder (ANSD) in a subject comprising:
   administering to the subject an adeno-associated virus (AAV) vector comprising: (i) an Anc80 capsid protein; and (ii) a DFNB59 gene,
   wherein the subject has a mutant DFNB59 gene that results in a G292R mutation in a Pejvakin (PJVK) protein, and wherein the mutant DFNB59 gene comprises the nucleotide sequence of SEQ ID NO: 2.

2. The method of claim 1, wherein the AAV vector further comprises an Espin promoter, a PCDH15 promoter, a PTPRQ promoter, or a TMHS (LHFPL5) promoter.

3. The method of claim 1, wherein the AAV vector further comprises a cytomegalovirus promoter.

4. The method of claim 1, wherein the AAV vector is an Anc80L65 vector.

5. The method of claim 1, wherein the mutant DFNB59 gene encodes an amino acid sequence comprising the sequence of SEQ ID NO: 1.

6. The method of claim 1, wherein the gene of DFNB59 in the AAV vector encodes a PJVK protein having a G at position 292.

7. The method of claim 1, wherein the gene of DFNB59 in the AAV vector encodes a PJVK polypeptide comprising the amino acid sequence of SEQ ID NO: 8.

8. The method of claim 1, wherein the method delivers the AAV vector to inner hair cells in the cochlea.

9. The method of claim 1, wherein the method delivers the AAV vector to outer hair cells in the cochlea.

10. The method of claim 1, wherein the method improves one or more symptoms of ANSD.

* * * * *